US011767438B2

(12) United States Patent
Drocco (10) Patent No.: US 11,767,438 B2
(45) Date of Patent: Sep. 26, 2023

(54) AUTOMATIC PLANT FOR PREPARING PAINTS AND THE LIKE

(71) Applicant: DROMONT S.p.A., Grinzane Cavour (IT)

(72) Inventor: Luca Drocco, Alba (IT)

(73) Assignee: DROMONT S.p.A.

( * ) Notice: Subject to any disclaimer, the term of this patent is extended or adjusted under 35 U.S.C. 154(b) by 325 days.

(21) Appl. No.: 17/242,801

(22) Filed: Apr. 28, 2021

(65) Prior Publication Data
US 2021/0340389 A1    Nov. 4, 2021

(30) Foreign Application Priority Data

Apr. 30, 2020   (IT) ........................ 102020000009547

(51) Int. Cl.
| | |
|---|---|
| *C09D 7/80* | (2018.01) |
| *B25J 5/02* | (2006.01) |
| *B25J 15/00* | (2006.01) |
| *B25J 13/08* | (2006.01) |
| *B01F 9/00* | (2006.01) |
| *B65B 7/28* | (2006.01) |

(Continued)

(52) U.S. Cl.
CPC ................ *C09D 7/80* (2018.01); *B01F 29/30* (2022.01); *B01F 29/34* (2022.01); *B25J 5/02* (2013.01); *B25J 13/08* (2013.01); *B25J 15/0014* (2013.01); *B25J 15/0028* (2013.01); *B65B 7/28* (2013.01); *G05B 15/02* (2013.01); *B01F 2101/30* (2022.01)

(58) Field of Classification Search
CPC . C09D 7/80; B01F 29/30; B01F 29/34; B01F 2101/30; B01F 33/8442; B01F 33/85; B01F 35/2205; B01F 35/423; B25J 5/02; B25J 13/08; B25J 15/0014; B25J 15/0028; B65B 7/28; B65B 61/00; G05B 15/02; B65C 9/26

See application file for complete search history.

(56) References Cited

U.S. PATENT DOCUMENTS

| | | | | |
|---|---|---|---|---|
| 5,203,387 A | * | 4/1993 | Howlett ................ | B01F 33/848 141/156 |
| 6,309,464 B1 | * | 10/2001 | Anfindsen ........... | B05B 12/1463 118/668 |

(Continued)

FOREIGN PATENT DOCUMENTS

| | | |
|---|---|---|
| EP | 3225301 A1 | 10/2017 |
| FR | 2972369 A1 | 9/2012 |

OTHER PUBLICATIONS

Talian Search Report dated Jan. 22, 2021. 8 pages.

*Primary Examiner* — Ramesh B Patel
(74) *Attorney, Agent, or Firm* — RMCK Law Group PLC (57) ABSTRACT

An automatic plant for preparing paints includes an automatic stock configured to contain a plurality of closed containers with different formats, an automatic process line comprising a plurality of operating stations, robotic unit movable between the various stations of the automatic process line to pick up each container in an inlet station and transfer it in succession from each station to the next station, the robotic unit having an adjustable gripping member configured for gripping containers with at least two different sizes, and a control unit configured to receive paint orders including information relating to the format of the containers and the color of the paint requested by the buyer.

6 Claims, 6 Drawing Sheets

(51) Int. Cl.
  *G05B 15/02* (2006.01)
  *B01F 29/30* (2022.01)
  *B01F 29/34* (2022.01)
  *B01F 101/30* (2022.01)

(56) References Cited

U.S. PATENT DOCUMENTS

| | | | |
|---|---|---|---|
| 6,494,608 B1* | 12/2002 | Retamal | B01F 35/82 |
| | | | 366/132 |
| 11,492,165 B2* | 11/2022 | Drocco | B65B 65/003 |
| 2003/0110101 A1* | 6/2003 | Friel | B01F 33/84 |
| | | | 705/28 |
| 2004/0017728 A1* | 1/2004 | Becker | G01N 35/0099 |
| | | | 366/605 |
| 2017/0072374 A1* | 3/2017 | Drocco | B01F 33/85 |
| 2017/0080394 A1* | 3/2017 | Drocco | B01F 33/5022 |
| 2020/0393819 A1* | 12/2020 | Drocco | G05B 19/41835 |
| 2021/0017008 A1* | 1/2021 | Drocco | G01F 23/72 |
| 2021/0291240 A1* | 9/2021 | Drocco | B08B 9/0813 |
| 2021/0340389 A1* | 11/2021 | Drocco | B01F 29/30 |
| 2021/0371147 A1* | 12/2021 | Drocco | B65B 69/00 |

* cited by examiner

AUTOMATIC PLANT FOR PREPARING PAINTS AND THE LIKE

CROSS-REFERENCE TO RELATED APPLICATION

This application claims priority to Italian Patent Application No. 102020000009547 filed Apr. 30, 2020. The disclosure of the above application is incorporated herein by reference in its entirety.

FIELD OF THE INVENTION

The present invention relates in general to the production of paints and the like and relates to an automatic plant for preparing paints.

More precisely, the invention relates to a plant wherein closed containers pre-filled with a neutral base are opened for adding dosed quantities of dyes, subsequently re-closed, stirred for a homogeneous mixing of the dyes with the base and, finally, labeled.

STATE OF THE ART

Paints and varnishes, whether for amateur or professional use, are commonly marketed by retail stores, department stores or distribution centers.

Usually, stores cannot have all possible colors and sizes of paints in stock. Therefore, shops that sell paints and the like are often equipped with tinting machines that form the paints required by the end user by adding dyes with neutral bases (usually white or transparent) contained in pre-filled containers. The tinting machines carry out the controlled dosage of the dyes necessary to obtain the color required by the user. After adding the dyes, mixing must be done to make the color homogeneous.

Preparing paints on request may involve long waiting times for the buyer, especially in the case of professional users who need medium-to-large quantities of products in a relatively short time.

In the state of the art, systems have already been proposed for preparing paints that allow limiting of the waiting time of users in the sales points. The document U.S. Pat. No. 6,959,284 discloses a paint preparation system wherein a consumer places an order for paints from a supplier via the internet or a telecommunication line. The customer's order information is entered into a computer and sent to a production line in which paints with the color specified in the order are prepared. Standard size containers are used in the production line. To achieve the quantity of paint indicated in the order, containers with standard dimensions can be partially filled.

Shoppers who buy paints at the point of sale often have different needs in terms of the format of the paint containers. Generally, automatic plants are configured to operate with a standard container format, and set-up operations are required to adapt the line to containers with different formats. Consequently, automatic systems are generally not suitable for producing small quantities of paints, in a short time, contained in containers with different formats.

OBJECT AND SUMMARY OF THE INVENTION

The present invention aims to provide an automatic plant for preparing paints that overcomes the problems of the prior art.

According to the present invention, this object is achieved by an automatic plant having the characteristics forming the subject of claim 1.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It will be appreciated that the various figures may not all be reproduced at the same scale and that some components may be removed to simplify the understanding of the figures.

DETAILED DESCRIPTION

Figure 1:
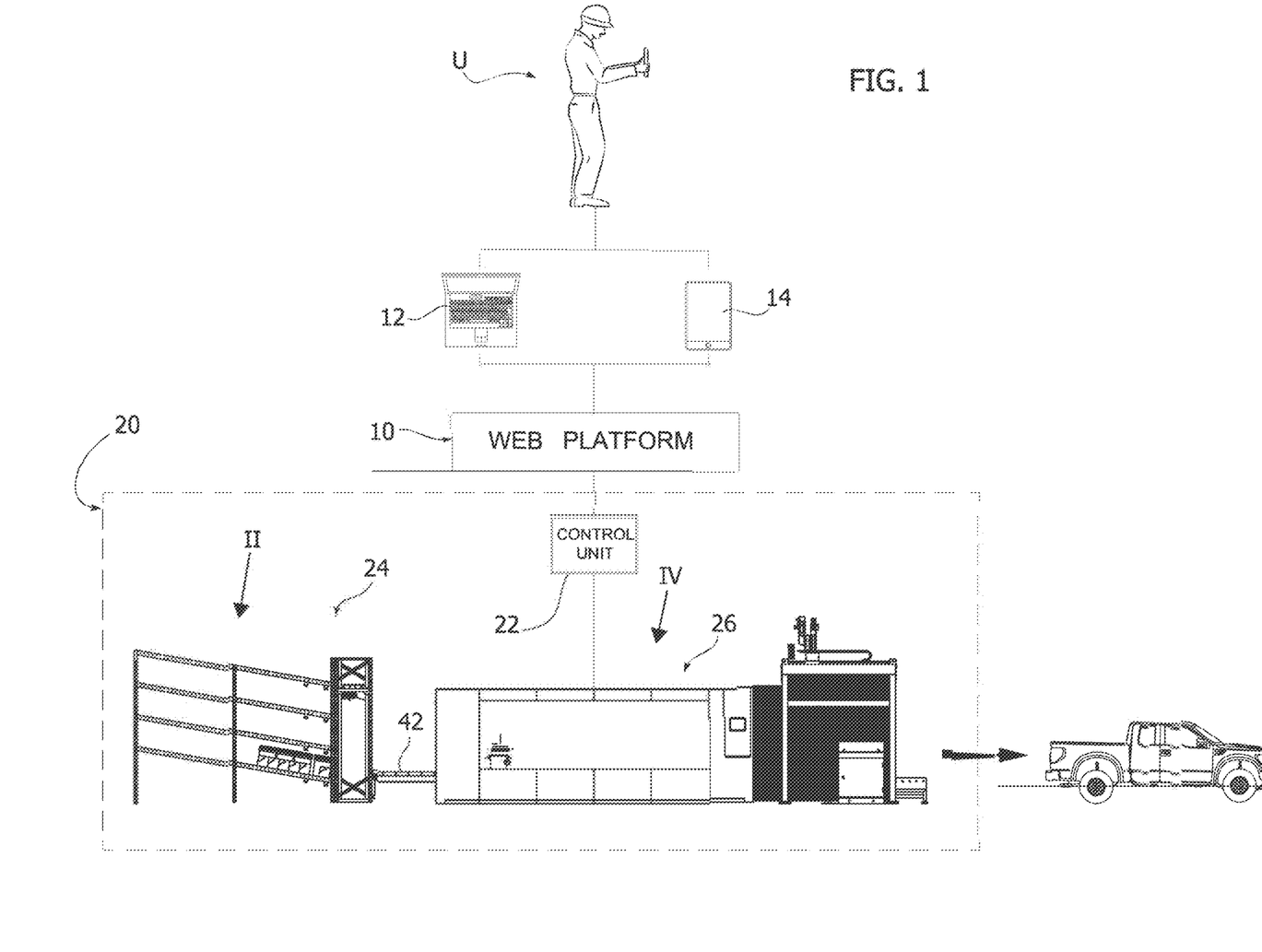
FIG. 1 is a schematic view of an automatic system for managing orders for paints and the like, FIG. 2 is a side view of an automatic stock indicated by the arrow II in FIG. 1.

With reference to FIG. 1, numeral 10 indicates a web platform for managing orders for paints and the like. The web platform 10 is configured to receive orders from users U, for example, via the internet. A generic user U may connect to the web platform 10 via the internet using a communication device such as a computer 12 or a mobile phone or tablet 14. The user U can place an order on the web platform 10 by connecting to a website or using a dedicated application.

The order entered on the web platform 10 includes at least the following information:
  color of the paint to be purchased, identified by a code,
  container size, selectable from a certain number of predetermined standard formats,
  number of containers of the selected format and with the paint of the required color,
  order collection methods (for example, at the point of sale, home delivery, collection at a delivery center, etc.),
  terms of payment.

The order entered on the web platform 10 may also contain information on the user's geographical position to allow the user to select the nearest point of purchase or collection.

Once a valid order has been received, the web platform 10 sends the order to an automatic plant 20 configured for producing paints. The web platform 10 may be interfaced with a plurality of automatic systems 20 and can be configured to select a specific automatic system 20 according to certain criteria, such as the proximity to the position of the user U, the availability of materials for preparing an order, order execution times, etc.

After selecting the plant 20 to send the order to, the web platform 10 sends an order for preparing paints 10 to an automatic plant 20. The order is received by a control unit 22 of the automatic plant 20. The control unit 22 controls and manages the various units of the plant 20 for preparing orders on the basis of the specifications received (color code, format of the containers, number of containers, etc.).

Figure 2:
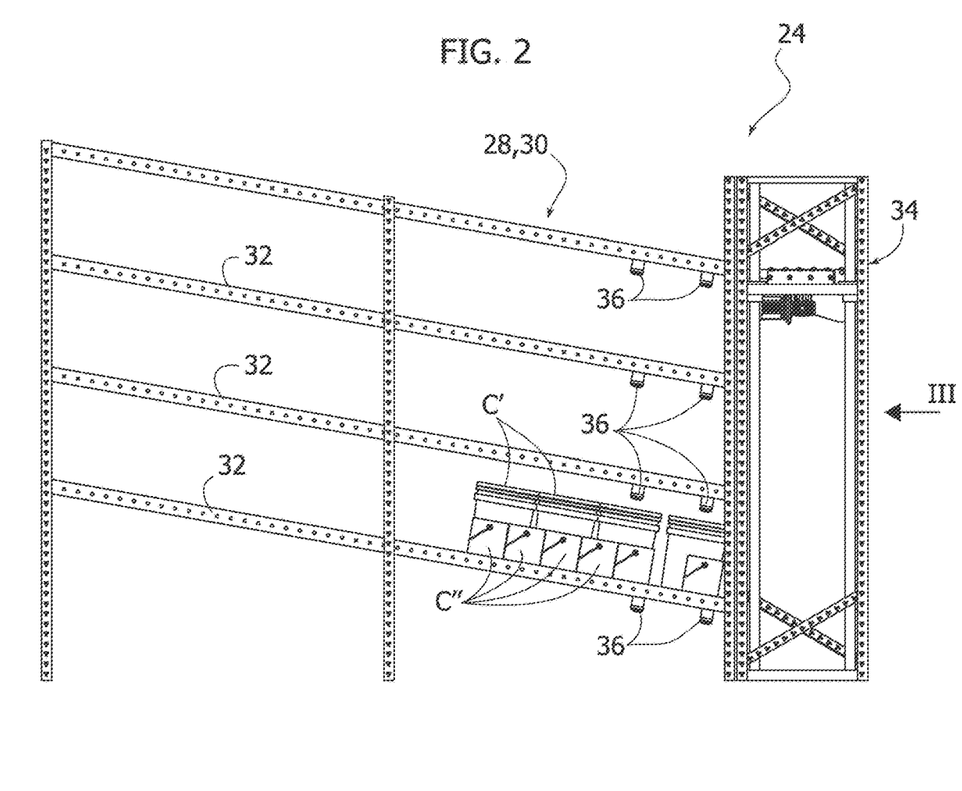
Figure 3:
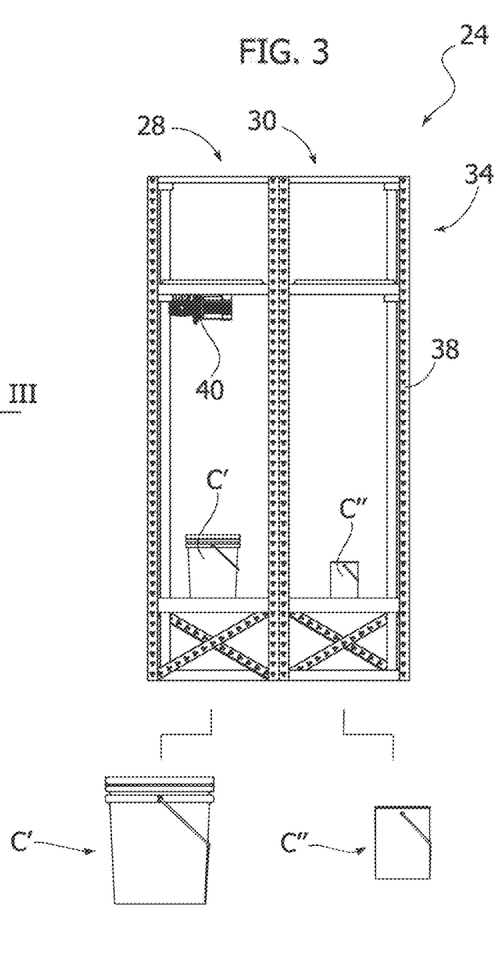
FIG. 3 is an elevational view according to the arrow III of FIG. 2.
Figure 4:
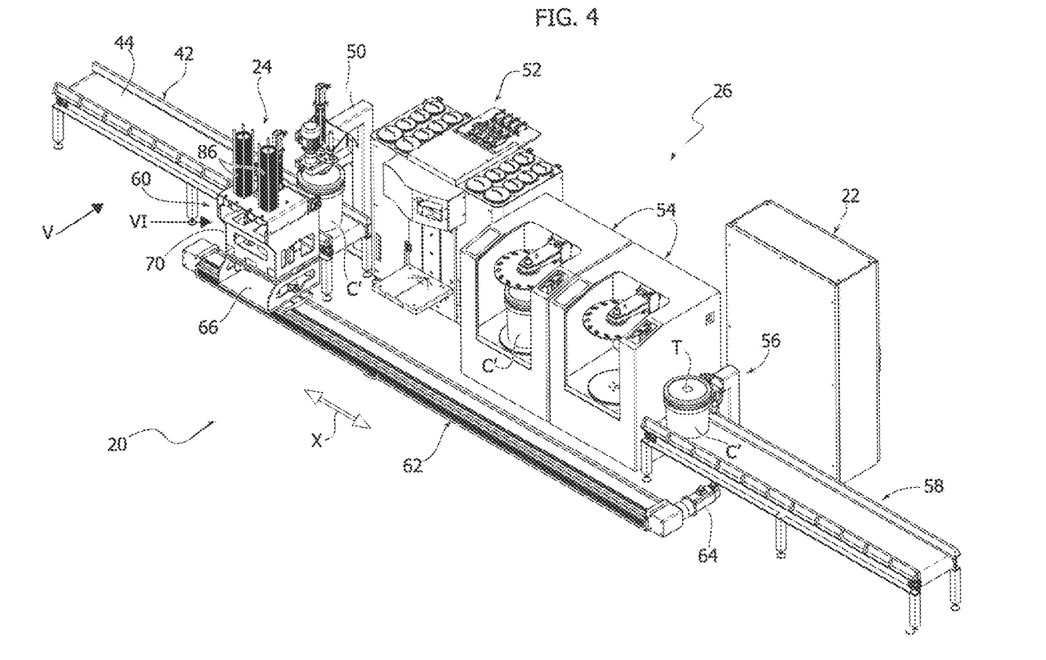
FIG. 4 is a perspective view of an automatic process line indicated by the arrow IV in FIG. 1.

The automatic plant 20 comprises an automatic stock 24 illustrated in FIGS. 2 and 3, and an automatic process line 26 illustrated in FIG. 4.

With reference to FIGS. 2 and 3, the automatic stock 24 contains a plurality of containers C', C" that are pre-filled with a neutral base, for example, white or transparent, and are closed by respective lids. The containers C', C" contained in the stock 24 have at least two different formats. In the example shown, the containers C', C" have two formats: a small format (for example of 5 liters) and a large format (for example of 25 liters). It is understood that the stock 24 can be configured to contain containers with a number of standard formats greater than two.

The stock 24 comprises a plurality of storage sectors 28, 30 that receive containers of different sizes. In the example shown, in the first storage sector 28 there are containers C' with the first format and in the second storage sector 30 there are containers C" with the second format.

The storage sectors 28, 30 of the stock 24 may comprise roller conveyors 32 inclined towards an automatic pick-up device 34. The containers C', C" advance by gravity along the roller conveyors 32. The roller conveyors 32 can be provided with respective locking devices 36, for example, with electric drive, which allow individually advancement of the containers C', C" towards a pick-up position. The automatic pick-up device 34 comprises a stationary frame 38 and a mobile platform 40 that receives the individual containers C', C" coming from the roller conveyors 32. The mobile platform 40 of the automatic pick-up device 34 is movable in a straight direction on three axes X, Y, Z and is operated by the electronic control unit 22. Based on the requests of the single order to be fulfilled, the platform 40 picks up the pre-filled containers of the format corresponding to the order and deposits them in an inlet station 42 (FIGS. 4 and 5) of the automatic processing line 26.

Figure 5:
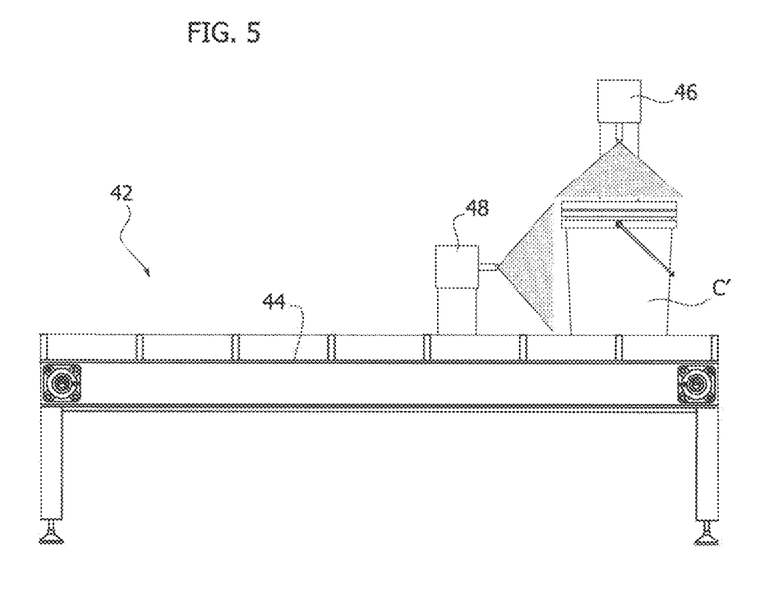
FIG. 5 is a side view of an inlet station indicated by the arrow V in FIG. 4, FIGS. 6 and 7 are side elevational and plan views of a robotic unit indicated by the arrow VI in FIG. 4 in the configuration for picking up and transporting containers of a first format.

With reference to FIG. 5, the inlet station 42 may comprise a conveyor belt 44 that transports the individual containers C', C" horizontally from the automatic stock 24 to the automatic process line 26. The inlet station 42 comprises a dimensional verification station that can be equipped with sensors 46, 48 to check the dimensions of the containers C', C". The sensors 46, can check the diameter and height of the containers C', C". The signals of the sensors 46, 48 are sent to the control unit 22, which verifies that the container located in the inlet station 42 corresponds to the order being executed.

With reference to FIG. 4, the automatic process line 26 comprises a drilling station 50, a dosing station 52, one or two stirring stations 54, a labeling station and an outlet station 58. All these stations are automatic stations operating under the control of control unit 22. The automatic process line 26 can be implemented as described in detail in the Italian patent application n. 10 2019 0000 21804 by the same Applicant.

Figure 8:
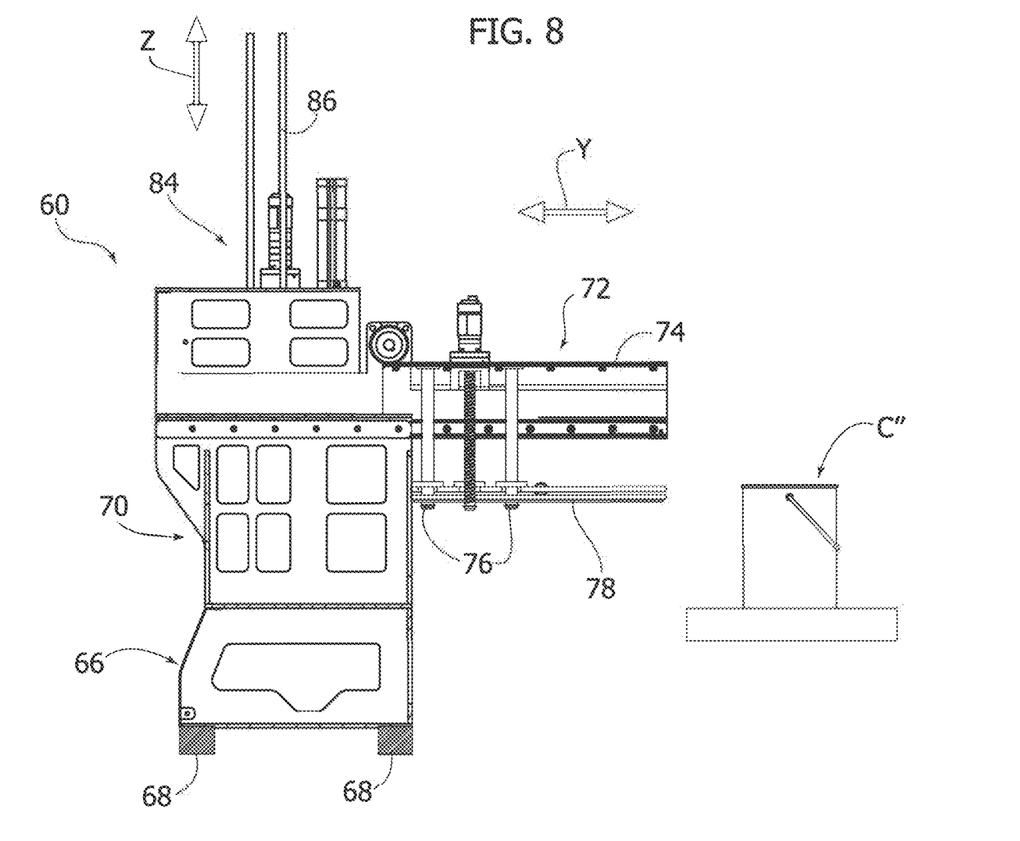
FIGS. 8 and 9 are side elevational and plan views of the robotic unit of FIGS. 6 and 7 in the configuration for picking up and transporting containers of a second format.
Figure 9:
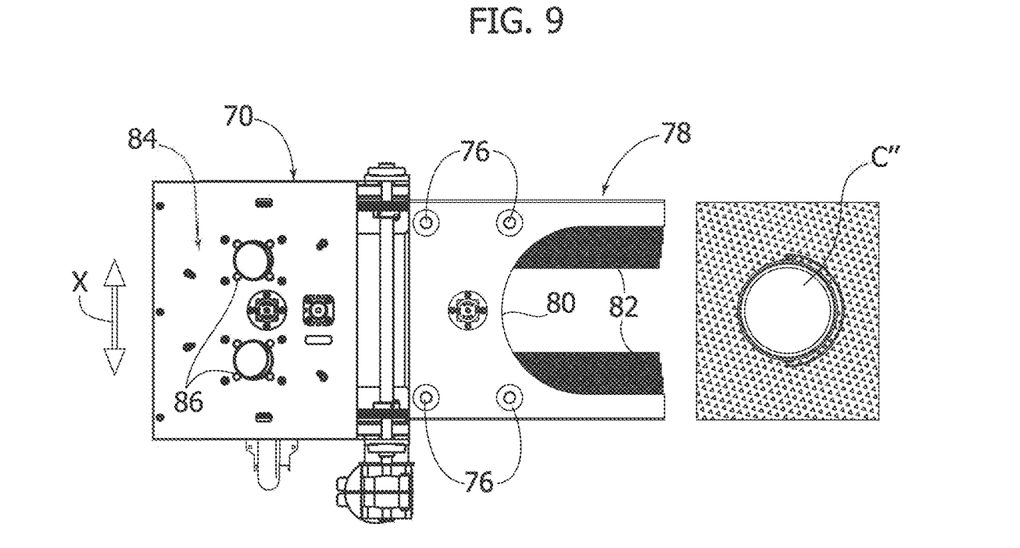

The plant 20 includes a robotic unit 60 movable along a guide 62 that extends along a straight direction X in front of the automatic process line 26. The movement of the robotic unit 60 along the guide 62 can be controlled by a belt or chain transmission driven by an electric motor 64 controlled by the electronic control unit 22. With reference to FIGS. 6-9, the robotic unit 60 comprises a base 66 provided with shoes 68 that engage the stationary guide 62 in a sliding manner. The robotic unit 60 comprises a support body 70 that is vertically displaceable (Z axis) with respect to the base 66 between a lowered position and a raised position. The support body 70 carries a gripping member 72 for gripping the containers C', C". The gripping member 72 comprises an upper base 74 that is displaceable with respect to the support body 70 along a transverse direction (Y axis) between a disengagement position and an engagement position, and that projects in a horizontal direction from the support body. 70. The upper base 74 carries vertical guide columns 76 along which a fork element 78 is movable in the vertical direction Z along the guide columns 76 between a raised position (FIG. 6) and one or more lowered positions (FIG. 8). The fork element 78 has a U-shaped seat 80 configured for gripping the containers C' with the largest diameter. The fork member 78 is also provided with two gripping elements 82 movable horizontally in the direction X, which allow the fork member 78 to be adapted to the containers C" with a diameter smaller than the maximum diameter.

The adjustment movements of the fork member 78 are controlled by electric actuators that operate under the control of the electronic control unit 22. On the basis of the information coming from the sensors 46, 48 that detect the size of the container C each time located in the inlet station 42, the electronic control unit 22 controls an automatic adjustment of the robotic unit 60 to adjust the height of the fork member 78 according to the height of the container C', C" to be picked up and the distance between the gripping members 82 according to the diameter of the container C', C" to be picked up.

FIGS. 6-9 illustrate the adjustment of the gripping member 72 only between two container sizes C', C". However, it is understood that the gripping member 72 can be adjusted between a higher number of gripping formats, depending on the number of standardized container formats that are available in the automatic stock 24.

After adapting the configuration of the gripping member 72 to the format of the container C', C", the gripping member 72 is moved in the direction Y to insert the container C', C". During the movement in the direction Y, the gripping elements 82 of the gripping member 72 engage an annular groove formed at the upper end of the container C', C". After engaging the container, the support body 70 of the robotic unit 60 is raised to lift the container C', C" from the surface on which it rests.

The adjustments of the robotic unit 60 to adapt the gripping member to different container formats are carried out completely automatically and allow the system 20 to be quickly adapted to the treatment of containers of any format, without the need for setting up manual operations in the case of switching from one container format to another.

Figure 6:
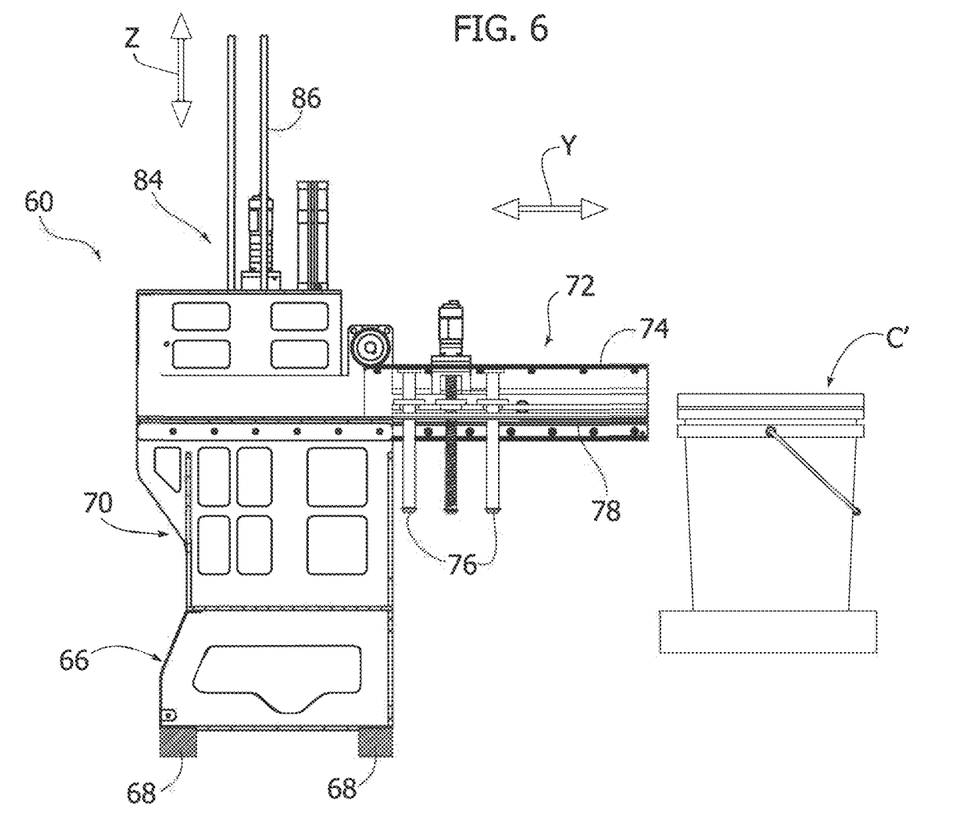
Figure 7:
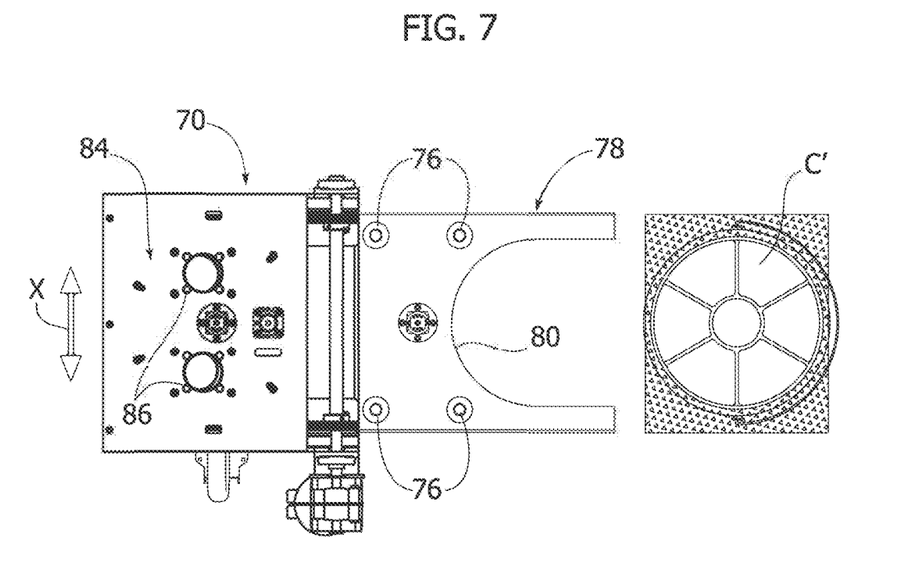

With reference to FIGS. 4, 6, 8, the robotic unit may comprise a cap application assembly 84 located above the support body 70, comprising one or more cap stocks 86 in which a plurality of caps are stacked vertically. The cap application assembly 84 also comprises a positioning member arranged to pick up a cap taken from one of the two stocks, and to position it on the hole of a container, and an introduction device configured to apply the cap into the hole of the lid.

The robotic unit 60 and the automatic process line 26 operate as described in detail in the Italian patent application n. 10 2019 0000 21804 by the same Applicant. In summary, the robotic unit 60 picks up a container C in the inlet station 42 and moves it in succession from one to the other of the operating stations 50-56 of the automatic process line 26.

In a first step, the robotic unit 60, under the control of the electronic control unit 22, adjusts the gripping member 72 to the format of the container located in the inlet station 42. Then, the robotic unit 60 picks up the container located in the inlet station 42 and carries it into the drilling station 50 in which a hole is formed on the lid of the container. Then, the robotic unit 60 moves the container with the perforated lid to the dosing station 52 in which the dyes necessary to obtain the paint of the required color are added to the neutral base contained in the container C through the hole made in the lid of the container. After the dosing operation, the robotic unit 60 applies a cap to the hole formed in the lid of the container and transfers the container to one of the stirring stations 54 where the container is picked up by two opposite plates and is rotated to mix the dyes to the base and obtain a uniform distribution of the dyes. The stirring stations automatically adapt to the height of the containers C under the command of the control unit 22. At the end of the stirring step, the robotic unit 60 picks up the container from the stirring station 54 and deposits it in the outlet station 58 where the labeling unit 56 provides the labeling of the container. Then, the containers C can be sent to a palletizing unit where the containers of the same order are packaged for dispatch or collection by the user.

The plant 20 is able to treat—in succession—containers with different sizes selected on the basis of the customer's order. Within the same order, paints with different colors can be prepared and contained in containers of different sizes. The automatic adaptation of the robotic unit 60 to containers of different sizes allows the plant 20 to operate with maximum flexibility without wasted time during the change of the container format.

Of course, without prejudice to the principle of the invention, the details of construction and the embodiments can be widely varied with respect to those described and illustrated, without thereby departing from the scope of the invention as defined by the claims that follow.

The invention claimed is:

1. An automatic plant for preparing paints, comprising:
   an automated stock configured to contain a plurality of closed containers pre-filled with a neutral base, wherein the automated stock has at least two storage sections configured for receiving containers with different sizes, wherein the automated stock includes an automatic pick-up device configured for picking up a container or containers of the plurality of containers in said two storage sections,
   an automatic process line having a plurality of stations including an inlet and dimension verification station, a drilling station for the formation of holes in the container lids of the containers, a dosing station for dosing dyes through the holes of the container lids, at least one stirring station for stirring the containers, a labeling station and an outlet station,
   a robotic unit movable between stations of the plurality of stations to pick up each container in the inlet and dimension verification station and transfer it in succession from one station of the plurality of stations to a next station of the plurality of stations until the outlet station, said robotic unit having an adjustable gripping member configured for gripping containers with at least two different sizes, and
   a control unit configured to receive a paint orders including information relating to a size of the containers and a color of the paint requested, wherein the control unit following a receipt of the order, controls the automatic pick-up device for picking up from the automated stock successive containers with sizes corresponding to the order and controls the robotic unit to adapt the automatic pick-up device to the size of the containers which from time to time are placed in the inlet and dimension verification station.

2. The plant of claim 1, wherein said robotic unit comprises a base slidably coupled to a stationary guide parallel to the automatic process line and a support body vertically movable with respect to the base between a lowered position and a raised position and carrying the adjustable gripping member, which is transversely movable between a retracted rest position and an extended position for the engagement of the containers.

3. The plant of claim 2, wherein said adjustable gripping member comprises a fork device movable in a vertical direction to adapt the adjustable gripping member to a height of the containers with different sizes.

4. The plant of claim 3, wherein said fork device has a U-shaped seat configured for engaging containers with a maximum diameter and carrying two gripping elements adjustable in a horizontal direction to adapt said U-shaped seat for picking up containers with a diameter smaller than said maximum diameter.

5. The plant of claim 1, wherein said inlet and dimension verification station is provided with sensors which transmit to said control unit information on the size of the containers arranged from time to time in the inlet and dimension verification station and wherein said control unit on the basis of the information provided by said sensors controls said robotic unit for the adjustment of the adjustable gripping member to the size corresponding to that of the container from time to time present in the inlet and dimension verification station.

6. The plant of claim 1, wherein said robotic unit carries a cap application assembly configured to apply caps for closing the holes formed in the container lids.

* * * * *

UNITED STATES PATENT AND TRADEMARK OFFICE
CERTIFICATE OF CORRECTION

| | |
|---|---|
| PATENT NO. | : 11,767,438 B2 |
| APPLICATION NO. | : 17/242801 |
| DATED | : September 26, 2023 |
| INVENTOR(S) | : Luca Drocco |

It is certified that error appears in the above-identified patent and that said Letters Patent is hereby corrected as shown below:

On the Title Page

Item (71) Applicant address information should be listed as:
- DROMONT S.p.A., Grinzane Cavour (Cuneo), ITALY -

Item (72) Inventor address information should be listed as:
- Luca DROCCO, Alba (Cuneo), ITALY -

Signed and Sealed this
Twenty-fifth Day of February, 2025

Coke Morgan Stewart
*Acting Director of the United States Patent and Trademark Office*